US00RE35026E

United States Patent [19]

Mahoney

[11] E Patent Number: Re. 35,026

[45] Reissued Date of Patent: Aug. 22, 1995

[54] SELF-ALIGNING THERMAL PRINT HEAD AND PAPER LOADING MECHANISM

[75] Inventor: Steven A. Mahoney, McMinnville, Oreg.

[73] Assignee: Hewlett-Packard Corporation, Palo Alto, Calif.

[21] Appl. No.: 245,938

[22] Filed: May 19, 1994

Related U.S. Patent Documents

Reissue of:

[64] Patent No.: 5,114,251
Issued: May 19, 1992
Appl. No.: 529,014
Filed: May 25, 1990

[51] Int. Cl.[6] ..... B41J 2/32

[52] U.S. Cl. ..... 400/120.17; 400/59; 400/120.01

[58] Field of Search ..... 400/120, 120 HE, 56, 400/57, 58, 59, 120.16, 648, 655, 660, 120.17, 120.01

[56] References Cited

U.S. PATENT DOCUMENTS

| | | | |
|---|---|---|---|
| 3,848,720 | 11/1974 | Carlsen | 197/1 R |
| 3,958,254 | 5/1976 | Okabe | 400/120 |
| 4,235,555 | 11/1980 | Aprato | 400/120 |
| 4,723,133 | 2/1988 | Walter | 400/625 |
| 4,755,834 | 7/1988 | Kunimitsu et al. | 400/120 |
| 4,848,945 | 7/1989 | Sone | 400/649 |
| 4,949,098 | 8/1990 | Gluck et al. | 400/120 |
| 4,953,994 | 9/1990 | Shinozaki et al. | 400/120 |
| 5,085,533 | 2/1992 | Kitahara et al. | 400/120.16 |
| 5,272,488 | 12/1993 | Kim | 400/120.16 |
| 5,304,007 | 4/1994 | Flanagan | 400/120.16 |

FOREIGN PATENT DOCUMENTS

| | | | |
|---|---|---|---|
| 0392213 | 3/1990 | European Pat. Off. . | |
| 60-105551 | 11/1983 | Japan . | |
| 61-24465 | 7/1984 | Japan . | |
| 60-104347 | 6/1985 | Japan . | |
| 0132366 | 6/1986 | Japan | 400/120 HE |
| 63-132065 | 11/1986 | Japan . | |
| 0251252 | 10/1988 | Japan | 400/120 HE |
| 63-251252 | 10/1988 | Japan . | |

*Primary Examiner*—Edgar S. Burr
*Assistant Examiner*—John S. Hilten
*Attorney, Agent, or Firm*—Curtis G. Rose

[57] ABSTRACT

A thermal printer is provided with a free floating print head and a sliding top supporting a platen roller. The platen roller is engageable with the print head such that a biased uniform force is applied to the print head. The sliding top is movable between a print ready position and a paper loading position. A wide gap is provided between the platen roller and the print head which in the paper loading position, allowing for easy paper loading without need for threading.

11 Claims, 3 Drawing Sheets

SELF-ALIGNING THERMAL PRINT HEAD AND PAPER LOADING MECHANISM

Matter enclosed in heavy brackets [ ] appears in the original patent but forms no part of this reissue specification; matter printed in italics indicates the additions made by reissue.

DESCRIPTION

1. Technical Field

The present invention relates generally to thermal printers, and more particularly to thermal array printers having a print head biasing means and simplified means for paper loading.

2. Background Art

Thermal printers have gained wide use in specific applications where hard copy is needed. For instance, thermal printers are often found in facsimile machines, cash registers, and diagnostic devices such as those used in the medical field. Thermal printers are popular for these and other stand-alone applications because of their compact size, high speed and relatively quiet operation.

Since many thermal printers are used as part of a specific stand-alone device, it is important that the printer operate reliably and with little difficulty. This is because the operator is more likely to be familiar with the device's main functions than with printer functions. Frequently these devices will be used by several different persons having various degrees of familiarity with the device. Therefore, such tasks as paper loading need to be simple and easy to do.

Easy paper loading is particularly important with devices like an electrocardiogram machine where the results are sometimes needed quickly. Thus, paper loading needs to be a task which does not require great care and precision. On the other hand, problems due to paper jams caused by misaligned or skewed paper need to be eliminated.

A further concern is reliability. As with nearly all devices reliability is a critical concern. This concern is perhaps greater in the medical field where diagnostic results are used routinely to determine the best course of medical action. Printer failures can completely disable a piece of expensive diagnostic equipment. Hence, reliable printer designs are needed.

A common thermal printer design is one in which a platen and a print head are in fixed relation with one another. In this design, the print head is generally biased against the platen by use of a spring or the like. Generally the print head may also be pivoted away from the platen to allow for paper to be loaded between the two. Such a design is exemplified in U.S. Pat. Nos. 4,718,785; 4,669,896; 4,560,292; and 4,170,422.

In U.S. Pat. No. 4,848,945 Sone discloses a printer having a stationary chassis and a movable chassis slidably mounted on the stationary chassis. A platen is mounted towards the front of the movable chassis. A print head is mounted towards the front of the stationary chassis such that the print head opposes the platen when the movable chassis is slid into an operating position. The print head is associated with an actuator which moves the print head toward and away from the platen. The actuator normally holds the print head away from the platen and is responsive to rotation of the platen to bias the print head against the platen. This design is intended to make loading a roll of paper more easy. Sone's design is fairly complex in that it has several levers and springs and other precision moving parts which make fabrication expensive and assembly difficult.

In view of the above, it is an object of the present invention to design a thermal printer in which paper handling is made easy and in which skew is automatically corrected.

It is another object of the present invention to design a thermal printer which does not require fabrication of high tolerance component parts, is simple in design and assembly, and is highly reliable.

SUMMARY OF THE INVENTION

The above objects have been achieved by a thermal printer design in which a print head is supported in a free floating support bracket coupled to a stationary frame. The novel design further has a platen roller that is supported on a sliding cover which is engageable with the support bracket. The print head support bracket is pivotally supported by a leaf spring arrangement which is associated with the stationary frame. The support bracket includes "U"-shaped forks which engage the shaft of the platen roller when the sliding cover is slid into an operating or print ready position. In this position the U-shaped forks align the print head with the center of the platen and the leaf spring arrangement provides a uniform force to the print head as it contacts the platen through a sheet of paper.

When the cover is slid away from the print head, the paper, stored in a compartment beneath the cover, can be easily loaded through the wide gap provided between the platen and the print head. The paper may either be of the fanfold type or provided in a roll. Edge preparations are not required.

Advantages to this design are that paper loading is made easy. Paper feeding is initiated by pulling the first sheet or beginning of the paper up through-the wide opening between the platen and the print head. Then the slidable cover needs only to be closed, thus pinching the paper between the platen and the print head. Because the print head is free floating, gross alignment errors can be tolerated because the leaf spring arrangement will still provide a uniform force along the entire length of the print head. Having a uniform force keeps the paper from "drifting", thereby not only eliminating the need for edge perforations but also the need to thread the paper through paper guides. A uniform force also ensures more uniform print density.

It will be appreciated that the present thermal printer design has few parts, thus making for easy assembly and manufacture. Moreover, because there are few moving parts the reliability of the design has proven to be high through environmental testing conducted by the assignee of the invention.

BEST MODE FOR CARRYING OUT THE INVENTION

Figure 1:
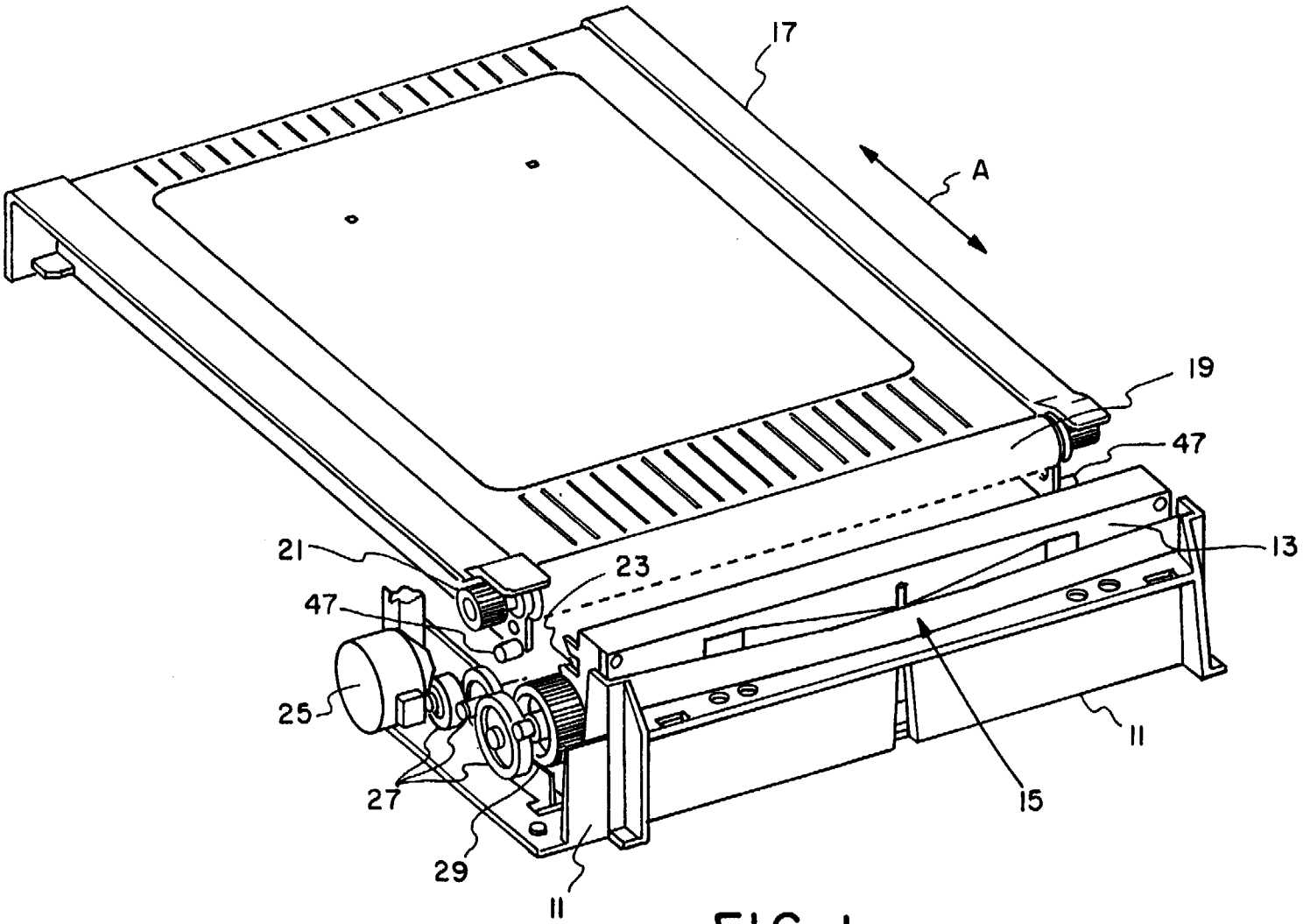
FIG. 1 is a perspective view of the preferred embodiment of a thermal printer in accord with the present invention. For simplification, only those parts critical to the invention are shown.

Referring to FIG. 1, a print station is assembly is shown having a stationary frame 11 and a slidable cover 17 coupled thereto. The stationary frame 11 supports a print head support bracket 13 in a free floating manner via a leaf spring arrangement 15. Details of the leaf spring arrangement 15 are discussed in greater particularity with relation to FIG. 2. The support bracket 13 contains a print head array having a multiplicity of heating elements spanning the entire width of the paper used. The individual heating elements are selectively energized to form marks on the paper. The stationary frame 11 may be made of molded plastic or similar rigid material, The support bracket 13 is preferably made from sheet metal, but may also be made of a plastic.

The sliding cover 17 supports a platen roller 19 at the end of the cover facing the print head support bracket. The platen roller 19 is rotatable about a shaft to which a platen drive gear 21 is attached. The sliding cover 17 is movable in the directions indicated by arrow A and is engageable with the print head support bracket 13. A pair of U-shaped forks 23 on opposite ends of the support bracket 13 are designed to receive the shaft of the platen roller 19, such that the print head array is aligned with the center of the platen. Stop surfaces 47 are provided on the sliding cover to press against the free floating support bracket 13 which help align the print head array with the platen. Guides, not shown may be used to direct the movement of the sliding cover 17. Molded plastic is preferably used to make the sliding cover.

The support frame 11 may also be used to support other printer elements, such as the drive assembly. The drive assembly includes a motor 25 and reduction gearing 27 which couple the motor 25 to a drive gear 29. When the sliding cover 17 is in an operating position the platen drive gear 21 meshes with the drive gear 29 to provide rotation of the platen. Proper alignment is important here so that the drive gears 21 and 29 adequately mesh.

Figure 2:
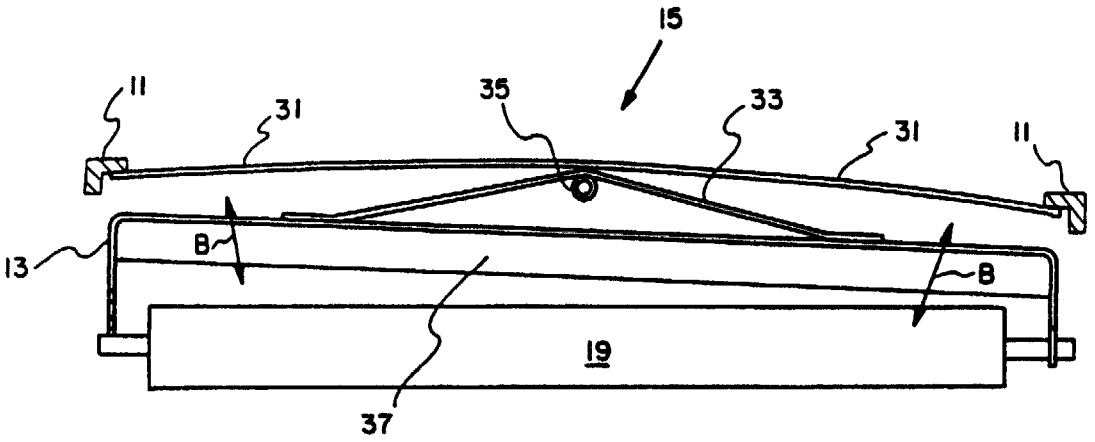
FIG. 2 is a simplified partial top view of FIG. 1.

Referring now to FIG. 2, the leaf spring arrangement 15 is shown to include a leaf spring 31 and a centering strap 33. The ends of the leaf spring are supported by indents in the support frame 11. A switch pin 35, which extends from the support frame 11, is positioned such that the leaf spring 31 is bent so as to provide a biasing force directed toward the switch pin and the platen 19. The centering strap 33 is a rigid member and is positioned between the leaf spring 31 and the switch pin 35. The centering strap 33 is attached to the back wall of the print head support bracket 13. Spot welding may be used to attach the centering strap to the support bracket. The centering strap 33 is not firmly attached to the leaf spring 31, rather it merely abuts the leaf spring, therefore it may freely pivot about its point of contact with the leaf spring 31 as indicated by arrows B. This allows the print head to free float about this pivot point and to align itself with the platen roller 19. Even gross misalignment, as shown, can be handled in this manner. To provide a uniform force to the print head it is important that the centering strap 33 be attached to the support bracket 13 such that the print head array pivots about the center of the array.

When the sliding cover 17 is slid to engage with the support bracket 13, the bracket is pushed back a certain amount so that the centering strap 33 no longer is in contact with the switch pin 35. Once this occurs the print head may be energized. At this point the leaf spring 31 provides a uniform pressure between the print head array 37 and the platen roller 19. Uniform pressure is not only important for maintaining proper print quality, but is also important in keeping the paper from drifting.

Figure 3:
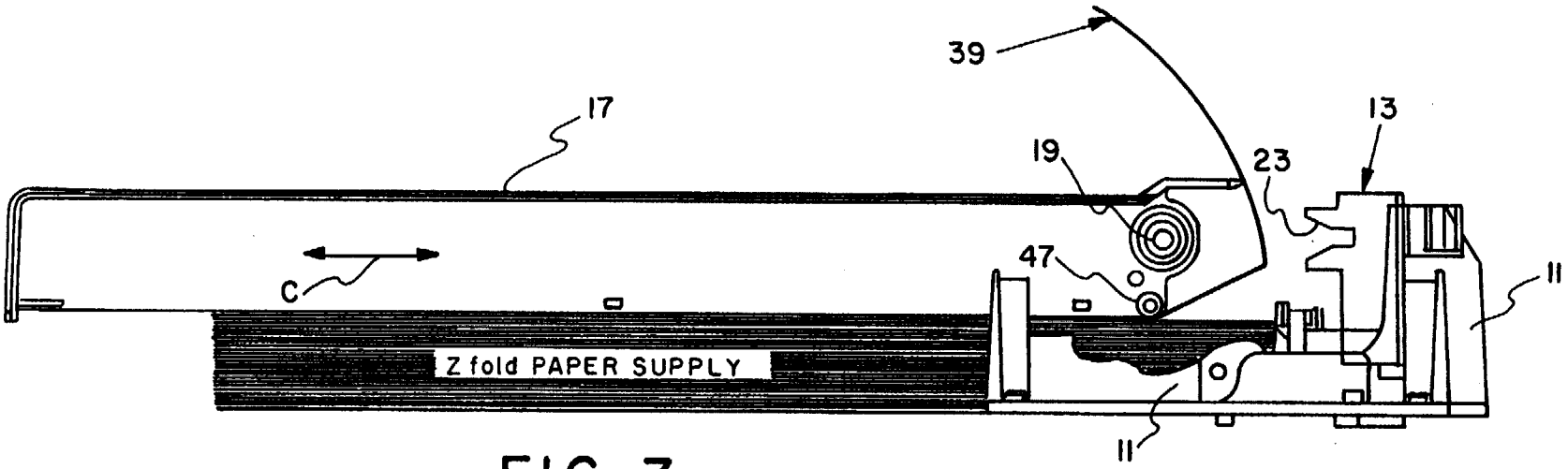
FIG. 3 is a side view of the preferred embodiment of FIG. 1 shown in a paper loading position.

In FIG. 3, the sliding cover 17 is open for paper loading. A supply of fanfold paper 39 is stored in a lower compartment beneath the sliding cover 17. To load the paper the first sheet is pulled up through the opening between the print head and the sliding cover 17. This opening is preferably wide enough to allow an operator's fingers to easily access the paper. The cover may also be completely removed so that a new supply of paper can be inserted into the printer. Once the first sheet is pulled through the opening the sliding cover 17 is then slid into a closed position with the paper 39 being pinched between the platen roller 19 and the print head array. Arrow C indicates the direction in which the cover 17 moves. No threading of the paper is required. This greatly simplifies the paper loading procedure as compared with previous methods and allows for rapid loading.

Figure 4:
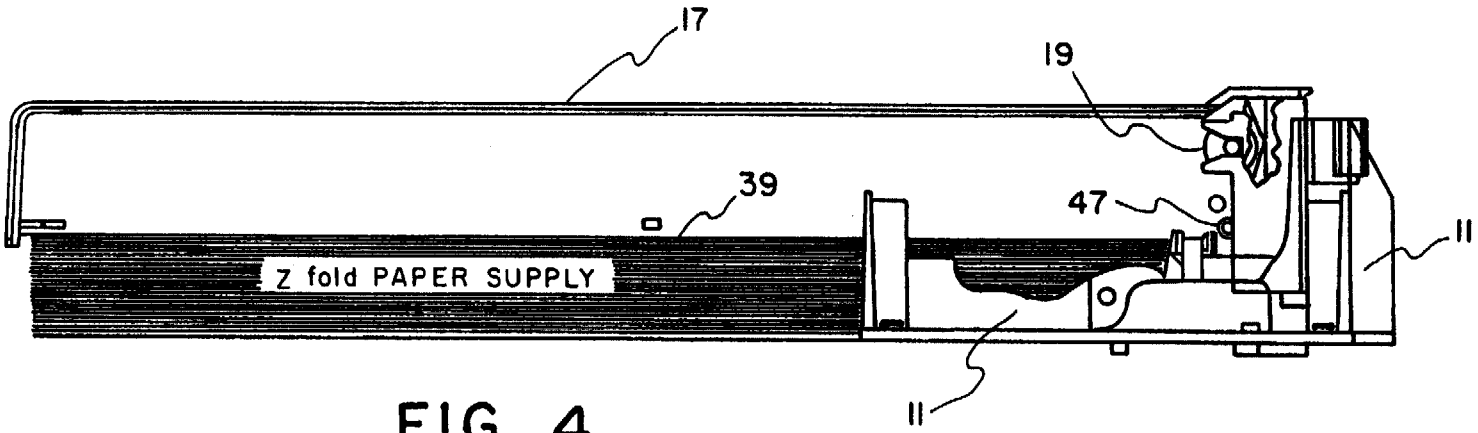
FIG. 4 is a side view of the embodiment of FIG. 1 shown in an operating position.

FIG. 4 shows the cover 17 closed with the print head array compliantly pressed against the platen roller 19. Thermal printers generally require contact between the print head and the paper. The stop surfaces 47 are also pressed against the support bracket 13. A means for locking and releasing the sliding cover 17 to and from the stationary frame 11 or the support bracket 13 may be provided. Various lock/release devices are known in the art and may be incorporated into the present invention.

Figure 5:
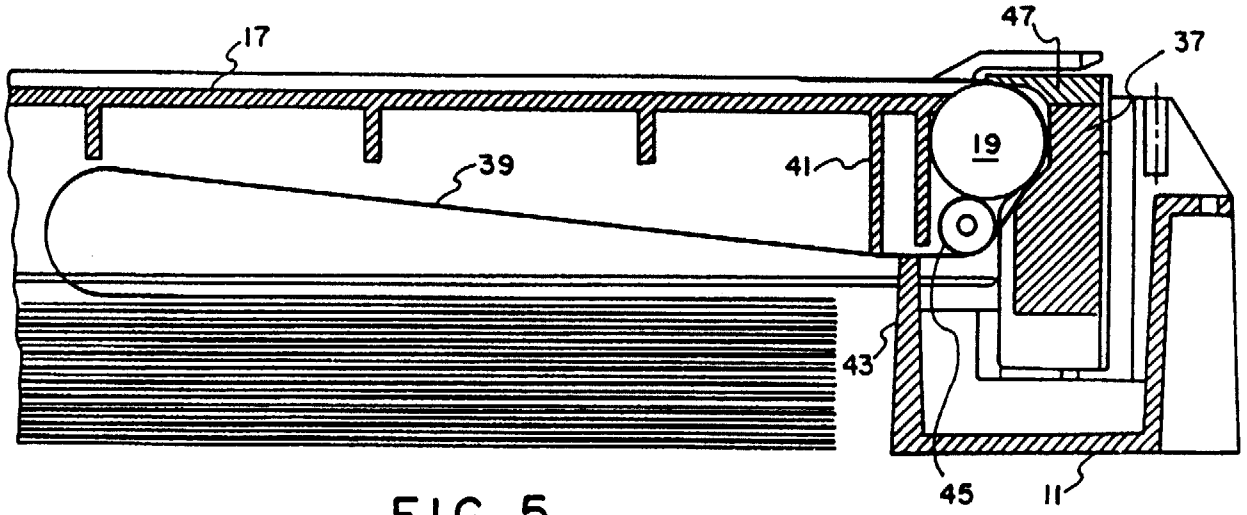
FIG. 5 is an enlarged partial cross-sectional view of the platen roller and print head details of FIGS. 3 and 4.

In FIG. 5 the paper path is shown in greater detail. The fan-folded paper 39 travels between upstanding members 41 and 43. The purpose of these members is to constrain the paper path so that folded paper does not enter the print station, i.e. the space between the print head and the platen. A guide roller 45 is used to direct the paper around the platen 19. Proper paper tension is important here so that the paper does not tear or slip. The paper 39 is discharged along the top of the sliding cover 17. A tear bar 49 is provided for assisting tearing the paper in a straight line.

I claim:

[1. A self-aligning thermal printer having a print head array and comprising, a stationary frame, an elongated print head array support bracket having a lengthwise dimension and platen receiving slots in in opposed ends of the bracket, a slidable member mounted to the stationary frame, the slidable member supporting a rotatable platen and being slidable from a print ready position and a paper loading position, a leaf spring connected to said stationary frame at opposed ends and free from said stationary frame between said ends for exerting a force toward said platen, centering means, connected to said support bracket and abutting said leaf spring, for directly distributing said force along the lengthwise dimension of said support bracket and toward said platen, and a switch pin set in said stationary frame and positioned to contact the centering means when the slidable member is not in the print ready position, the centering means moving away from the switch pin when the slidable member is slid into the print ready position thereby allowing the print head to be energized.]

[2. A self-aligning thermal print head mounting mechanism comprising, a stationary frame, a print head support bracket supporting a thermal print head array, the bracket having a back wall and a pair of extending side walls, each side wall having a U-shaped receiving slot, a moveable cover supporting a platen and being slidable from an engaged position and a disengaged position with the print head support bracket, the platen being rotatable about an axis and having a shaft which is adapted to being received in said pair of U-shaped slots with the axis of rotation of the platen being aligned parallel to the print head array, means associated between the stationary frame and the support bracket for pivotally biasing the support bracket in a free floating manner, said means for biasing including a leaf spring with ends supported by said stationary frame and biased to exert a force towards the platen, and a centering strap coupled to said print head supporting bracket, the leaf spring and the centering strap being in abutting relation at a point of contact such that the centering strap pivots about the point of contact, and a switch pin set in said stationary frame and positioned to contact the centering strap when the movable cover is not in the engaged position, the centering strap moving away from the switch pin when the movable cover is slid into the engaged position thereby allowing the print head to be energized.]

[3. A self-aligning thermal print head mounting mechanism comprising, a stationary frame, a print head support bracket supporting a thermal print head array, the bracket having a back wall and a pair of extending side walls, each side wall having a U-shaped receiving slot, means associated between the stationary frame and the support bracket for pivotally biasing the support bracket in a free floating manner, the means for biasing including a leaf spring with ends supported by said stationary frame and biased to exert a force towards the platen, and a centering strap coupled to said print head supporting bracket, the leaf spring and the centering strap being in abutting relation at a point of contact such that the centering strap pivots about the point of contact, and a movable cover supporting a platen and being slidable from an engaged position and a disengaged position with the print head support bracket, the platen being rotatable about an axis and having a shaft which is adapted to being received in said pair of U-shaped slots with the axis of rotation of the platen being aligned parallel to the print head array, a switch pin set in said stationary frame and positioned to contact the centering strap when the movable cover is not in the engaged position, the centering strap moving away from the switch pin when the movable cover is slid into the print ready position thereby allowing the print head to be energized, and motive means associated with said stationary frame and a drive coupling means associated with said platen, the drive coupling means being engagable with the motive means for providing rotation to the platen when in the print ready position.]

*4. A self-aligning thermal printer comprising:*

*a stationary frame;*

*a print head array supported by a bracket said bracket further comprising a slot at each end of said bracket;*

*a platen roller supported by a member slidably mounted on said stationary frame for movement between a print ready position and a paper loading position at which respective positions the platen roller is located by, and removed from, the slots in said bracket;*

*a leaf spring having opposite ends supported by said stationary frame so that an unsupported part of the spring can bias the bracket the print head array towards the platen roller when the platen roller is in its print ready position, and*

*centering means connected to said bracket and pivotally abutting the leaf spring so as to distribute the bias of the leaf spring uniformly to the bracket and the print head array when the platen roller is in its print ready position.*

*5. The printer of claim 4, wherein said centering means is a centering strap.*

*6. The printer of claim 4 further comprising a switch pin on the stationary frame, the switch pin being positioned so as to be engaged with the centering means when the platen roller is in its paper loading position, and so as to be disengaged from the centering means when the platen roller is in its print ready position, wherein the print head array is energized only when the platen roller is in its print ready position.*

*7. The printer of claim 4, wherein the bracket further comprises a back wall and a pair of extending side walls in which the slots are provided, the side walls and slots forming U-shaped forks, said platen roller having a shaft which is received in the U-shaped forks when said platen roller is in its print ready position.*

*8. The printer of claim 6, wherein the bracket further comprises a back wall and a pair of extending side walls in which the slots are provided, the side walls and slots forming U-shaped forks, said platen roller having a shaft which is received in the U-shaped forks when said platen roller is in its print ready position.*

*9. The printer of claim 4, wherein the member is a cover which can be slid open to move the platen roller into its paper loading position, said paper loading position enabling manual access to paper when loaded in the printer.*

*10. The printer of claim 6, wherein the member is a cover which can be slid open to move the platen roller into its paper loading position, said paper loading position enabling manual access to paper when loaded in the printer.*

*11. The printer of claim 4 wherein the cover is completely removable to allow for loading the printer with paper, said printer allowing for the first sheet of the paper to be pulled through an opening between the platen roller and the print head array when the platen roller is in its paper loading position.*

*12. The printer of claim 6, wherein the cover is completely removable to allow for loading the printer with paper, said printer allowing for the first sheet of the paper to be pulled through an opening between the planten roller and the print head array when the platen roller is in its paper loading position.*

*13. The printer of claim 4, further comprising:*

*motor on the stationary frame; and*

*gearing for enabling the motor to rotate the platen roller when the platen roller is in its print ready position, the*

*gearing being operatively disconnected from the motor when the platen roller is moved into its paper loading position.*

*14. The printer of claim 6, further comprising:*

*a motor on the stationary frame; and*

*gearing for enabling the motor to rotate the platen roller when the platen roller is in its print ready position, the gearing being operatively disconnected from the motor when the platen roller is moved into its paper loading position.*

* * * * *